United States Patent [19]

Carey

[11] 3,755,337

[45] Aug. 28, 1973

[54] MANUFACTURE OF 1,1-DISUBSTITUTED-4,4-BIPYRIDYLIUM SALTS

[75] Inventor: John Gerard Carey, Runcorn, England

[73] Assignee: Imperial Chemical Industries Limited, London, England

[22] Filed: Oct. 20, 1970

[21] Appl. No.: 82,503

[30] Foreign Application Priority Data
Oct. 27, 1969  Great Britain ................... 52,450/69

[52] U.S. Cl. ....... 260/295 Q, 260/296 D, 260/247.2, 260/247.5, 260/293.63, 260/293.69, 71/82
[51] Int. Cl. ............................................ C07d 31/32
[58] Field of Search .................... 260/296 D, 295 Q

[56] References Cited
UNITED STATES PATENTS
3,336,325  8/1967  Downes et al. ................ 260/296 D
3,405,135  10/1968  Colchester et al. ............. 260/296 D

*Primary Examiner*—Henry R. Jiles
*Assistant Examiner*—Robert T. Bond
*Attorney*—Cushman, Darby & Cushman

[57] ABSTRACT

A process for the manufacture of a 1,1'-disubstituted-4,4'-bipyridylium salt which comprises reacting the corresponding N-substituted pyridinium salt with cyanamide ions, for example provided by an alkali metal cyanamide, and subsequently oxidising the resulting interaction product, for example by means of an oxidising agent which is an electron acceptor and which has a redox potential in water more positive than —0.50 volt as compared with the saturated calomel electrode.

12 Claims, No Drawings

MANUFACTURE OF 1,1'-DISUBSTITUTED-4,4-BIPYRIDYLIUM SALTS

This invention relates to the manufacture of 1,1'-disubstituted-4,4'-bipyridylium salts which are useful herbicides.

According to the present invention we provide a process for the manufacture of a 1,1'-disubstituted-4,4'-bipyridylium salt which comprises reacting the corresponding N-substituted pyridinium salt with cyanamide ions and subsequently oxidising the resulting interaction product.

The cyanamide ions ($HC{=}C{=}N^{\ominus}$) may be provided by a wide range of cyanamides, including metal and especially alkali metal cyanamides for example sodium cyanamide.

The reaction can be carried out simply by mixing the reagents and heating the mixture if necessary, but we prefer to carry out the reaction in a solvent for the N-substituted pyridinium salt. It is preferred to use a polar aprotic solvent, for example acetone, amides and particularly tertiary alkyl amides (for example dimethylformamide), sulphoxides (for example dimethylsulphoxide), sulphones (for example sulpholane), nitriles (for example acetonitrile), nitro compounds (for example nitropropane), and alkyl carbonates (for example propylene carbonate). Mixtures of solvents may be used if desired.

The temperature at which the reaction is carried out is not critical although in some cases it is advantageous to heat the reaction mixture. In general the reaction may be carried out at a temperature from 25°C to 120°C, preferably from 40°C to 90°C. Temperatures above 150°C should in general be avoided. Usually the reaction will be carried out under an inert atmosphere.

The reaction is preferably carried out under basic conditions and it may be carried out in the presence of an added base. A strong base (if present) is preferred, for example an alkali metal hydroxide, although ammonium hydroxide or an organic amine may be used. In polar aprotic solvents, for example anhydrous dimethyl sulphoxide the addition of a separate base may not be essential since the cyanamide itself may be sufficiently basic under the reaction conditions. A separate base may, however, be added in such cases if desired.

The amount of the cyanamide is not critical although we prefer to employ an excess of cyanamide ions. Preferably at least 0.25 mole of the cyanamide ions is used per mole of the N-substituted pyridinium salt. The concentration of the pyridinium salt in cases where it is employed in the form of a solution will depend upon the particular solvent used; the optimum concentration in each case can be determined by simple experiment. In general, however, concentrations of from 0.1 to 2.0 moles per litre and especially about 0.5 mole per litre are suitable.

Any N-substituted pyridinium salt may be converted to the corresponding 1,1'-disubstituted-4,4'-bipyridylium salt by the process of the invention and particularly suitable salts are those having an alkyl or a carbamidoalkyl substituent on the nitrogen atom of the pyridine nucleus. The carbamidoalkyl substituent has the formula $-R_1-CO-NR_2R_3$ wherein $R_1$ is a hydrocarbon radical (especially the methylene radical) and $R_2$ and $R_3$ are hydrocarbon or substituted hydrocarbon radicals and $R_2$ and $R_3$ may, together with the attached nitrogen atom make up a heterocyclic ring for example an optionally substituted piperidine or morpholine ring. The salt is conveniently a halide and especially the chloride salt, though the anionic species is not critical and other salts for example the methosulphate may be used, if desired. The pyridine nucleus may be substituted, for example by one or more alkyl groups in the 2, 3, 5 and 6 positions, but the 4-position preferably should be unoccupied. In the case of an N-alkyl pyridinium salt the alkyl group preferably contains from one to four carbon atoms. Similarly where the groups $R_2$ and $R_3$ are alkyl groups these preferably contain from 1 to 4 carbon atoms.

The interaction product derived from the pyridinium salt and the cyanamide ions is a 1,1'-disubstituted-1,1'-dihydro-4,4'-bipyridyl which is readily oxidised to the corresponding 1,1'-disubstituted-4,4'-bipyridylium salt by treatment with an oxidising agent which is an electron acceptor and which has a redox potential in water more positive than −0.50 volt as compared with the saturated calomel electrode. Examples of suitable oxidising agents are ceric sulphate (in dilute sulphuric acid); metal salts, especially the halides; inorganic oxyacid anhydrides, especially sulphur dioxide; chlorine; air or oxygen, preferably in conjunction with water and/or carbon dioxide and/or an acid for example acetic acid or sulphuric acid; and organic oxidising agents for example quinones such as benzoquinone, chloranil and anthraquinone. The oxidation is advantageously carried out under acidic conditions, the apparent pH of the reaction mixture being preferably less than 6, especially from 4 to 6. Addition of the oxidising agent in an acidic medium is usually sufficient to achieve this result. A wide range of temperatures, for example from 0°C to 100°C may be employed for the oxidation step.

Depending upon the conditions under which it is prepared the 1,1'-disubstituted dihydrobipyridyl interaction product may be in the form of a solution or a slurry.

The 1,1'-disubstituted dihydrobipyridyl can be oxidised directly without isolation from the mixture in which it has been prepared but it is usually more convenient to isolate the intermediate reaction product prior to oxidising it so that oxidation yields a fairly pure bipyridylium salt. In the case where the intermediate product is a slurry the solid can be isolated by filtration or preferably by solvent extraction. Suitable solvents for the extraction are hydrocarbons, especially aromatic hydrocarbons and notably toluene. The temperature of the extraction can be from 0°C to 100°C.

In the case where the intermediate reaction product is in solution, as for example when it is prepared in a polar aprotic solvent, we have found that a useful technique for isolating it is to add water or an acid, e.g. an organic acid, notably acetic acid, to the reaction mixture. The temperature of this treatment can be from 0°C to 100°C, preferably from 20°C to 50°C. The solid and liquid phases of the slurry so obtained can be treated as described above to recover the intermediate reaction product.

1,1'-disubstituted-4,4'-bipyridylium cations may conveniently be separated from the anions in the final reaction mixture by treating the mixture with 4,4'-diamino-stilbene-2,2'-disulphonic acid which is commonly known as "amsonic acid." The bipyridylium cation is thereby precipitated from the mixture in the form of its amsonate salt whilst the anions remain in the mixture. The precipitate can then be removed by filtration, washed and dried in conventional manner and the amsonic acid can be regenerated and recovered for re-use by acidification of the amsonate salt, preferably employing an aqueous solution of the acid. The acid used to recover the amsonic acid can be selected so as to provide the desired anion for the resulting bipyridylium salt and can be for example hydrochloric acid, phosphoric acid or acetic acid.

Amsonic acid is only sparingly soluble in water and it is therefore usually employed in the present invention in the form of an aqueous solution of one of its water-soluble salts, conveniently an alkali metal salt or the ammonium salt. The treatment of the reaction mixture with amsonic acid can be conveniently at a pH in the range 7 to 12, and at a temperature of from 0°C to 100°C.

The 1,1'-disubstituted-4,4'-bipyridylium cation can also be separated from the anions in the reaction mixture by contacting this mixture with a suitable cation-exchange resin. In this way the anions pass through the resin and remain in the mixture so that they are separated from the bipyridylium cation. The bipyridylium cation can subsequently be liberated from the ion-exchange resin by treatment of the resin with an acid. In this way a bipyridylium salt is obtained wherein the anion is that supplied by the acid. Examples of the anions which may be introduced into mixture in this way are chloride, sulphate and acetate ions.

The temperature at which the mixture is contacted with the ion-exchange resin is not critical but can conveniently be from 0°C to 100°C. Examples of suitable cation-exchange resins are Zeocarb cation exchange resins, for example Zeocarb 225 (SRC-8), the Amberlite cation exchange resins for example Amberlite Resin C6-120, and the Deacidite resins.

The invention is illustrated but in no way limited by the following examples.

EXAMPLE 1

N-methyl pyridinium chloride (0.01 mole) was added with stirring a solution of sodium cyanamide (0.02 mole) in dimethyl sulphoxide (30 ml) at 70°C under an atmosphere of nitrogen. The solution became dark brown in colour. After 2½ hours a cooled solution of sulphur dioxide in dimethyl sulphoxide was added to the reaction mixture. Excess sulphur dioxide was then removed from the mixture by bubbling nitrogen gass through it.

The resultant mixture contained 0.31g of 1,1'-dimethyl-4,4'-bipyridylium ion, representing a reaction efficiency of 33 percent based on methyl pyridinium chloride fed. The product was identified by reduction with sodium dithionite in water at pH 9 followed by colourimetric and polarographic analysis of the resulting coloured solution.

EXAMPLE 2

The procedure of Example 1 was repeated using N-(N-dimethyl-carbamidomethyl)-pyridinium chloride instead of N-methyl pyridinium chloride. The product was 1,1'-di(N-dimethyl carbamidomethyl)-4,4'-bipyridylium ion and the reaction efficiency was 20 percent based on pyridinium salt fed.

I claim:

1. A process for the manufacture of a 1,1'-disubstituted-4,4'-bipyridylium salt wherein the 1,1-substituents are selected from alkyl of one to four carbon atoms and carbamidoalkyl of the formula $-R_1-CO-NR_2R_3$ wherein $R_1$ is the methylene radical, $R_2$ and $R_3$ are alkyl groups of one to four carbon atoms and $R_2$ and $R_3$ may, together with the attached nitrogen atom, make up a piperidine or morpholine ring which comprises reacting in a polar aprotic solvent at temperatures from 25°C to 120°C at least 0.1 moles per litre of the corresponding N-substituted pyridylium salt with cyanamide ions under basic conditions to form a 1,1'-di-substituted-1,1'-dihydro-4,4'-bipyridyl and subsequently treating the dihydrobipyridyl with an oxidising agent which is an electron acceptor and which has a redox potential in water more positive than -0.50 volt as compared with the saturated calomel electrode to form the 1,1'-disubstituted-4,4'-bipyridylium salt.

2. A process as claimed in claim 1 wherein the cyanamide ions are provided by an alkali metal cyanamide.

3. A process as claimed in claim 1 wherein the reaction is carried out at a temperature of from 40°C to 90°C.

4. A process as claimed in claim 1 wherein the reaction is carried out in the presence of an added base.

5. A process as claimed in claim 1 wherein at least 0.25 mole of cyanamide ions is employed per mole of the N-substituted pyridinium salt.

6. A process as claimed in claim 1 wherein the concentration of the N-substituted pyridinium salt is from 0.1 to 2 moles per litre.

7. A process as claimed in claim 1 wherein the oxidation is carried out under acidic conditions.

8. A process as claimed in claim 1 wherein the interaction mixture is isolated prior to oxidation from the reaction mixture in which it has been prepared.

9. A process as claimed in claim 8 wherein the interaction product is in solution and is precipitated by adding water or acid to the reaction mixture.

10. A process as claimed in claim 8 wherein the interaction product is isolated by solvent extraction.

11. A process as claimed in claim 1 wherein the 1,1'-substituents of the 1,1'-disubstituted-4,4'-bipyridylium salt are carbamidomethyl groups.

12. A process as claimed in claim 10 wherein each alkyl group is the methyl group.

* * * * *